(12) United States Patent
Crabtree et al.

(10) Patent No.: US 12,717,624 B2
(45) Date of Patent: Aug. 25, 2026

(54) INTEGRATED VALUE CHAIN RISK-BASED PROFILING AND OPTIMIZATION

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 317 days.

(21) Appl. No.: 17/088,387

(22) Filed: Nov. 3, 2020

(65) Prior Publication Data

US 2021/0173711 A1 Jun. 10, 2021

Related U.S. Application Data

(63) Continuation-in-part of application No. 16/945,698, filed on Jul. 31, 2020, now abandoned, which is a
(Continued)

(51) Int. Cl.
*G06F 9/50* (2006.01)
*G06N 5/025* (2023.01)
(Continued)

(52) U.S. Cl.
CPC .......... *G06F 9/5011* (2013.01); *G06N 5/025* (2013.01); *G06Q 10/067* (2013.01);
(Continued)

(58) Field of Classification Search
CPC .. G06F 9/5011; G06F 21/577; G06F 16/9024; G06N 5/025; G06N 20/00;
(Continued)

(56) References Cited

U.S. PATENT DOCUMENTS 6,256,544 B1 7/2001 Weissinger
7,249,007 B1 * 7/2007 Dutton .................. G06Q 40/04
703/2
(Continued)

FOREIGN PATENT DOCUMENTS

CN 102253933 A 11/2011
WO 2011011942 A1 2/2011
(Continued)

*Primary Examiner* — Kavita Stanley
*Assistant Examiner* — Cao D Vuong
(74) *Attorney, Agent, or Firm* — NK Patent Law

(57) ABSTRACT

A system and method for gathering and analyzing the value chain relationships between legal entities, people, systems, and real and intangible assets using a temporospatial knowledge graph of the integrated value chain. The system provides the ability to layer private data from paid vendors with end-user owned and public records data to enable more comprehensive, contextualized and complete representations of the underlying value chain. Data analysis techniques, such as deep learning and machine learning, are performed on the knowledge graph and its underlying data set, in conjunction with simulation and modeling, to analyze the value chain, including generation of a risk profile for an entity's value chain and potential optimization options to remediate the identified risks.

10 Claims, 9 Drawing Sheets

Related U.S. Application Data continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 17/088,387, filed on Nov. 3, 2020 is a continuation-in-part of application No. 16/945,698, filed on Jul. 31, 2020, now abandoned, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/616,427, filed on Jun. 7, 2017, now abandoned, which is a continuation-in-part of application No. 14/925,974, filed on Oct. 28, 2015, now abandoned, application No. 17/088,387, filed on Nov. 3, 2020 is a continuation-in-part of application No. 16/945,698, filed on Jul. 31, 2020, now abandoned, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, application No. 17/088,387, filed on Nov. 3, 2020 is a continuation-in-part of application No. 16/945,698, filed on Jul. 31, 2020, now abandoned, which is a continuation-in-part of application No. 16/915,176, filed on Jun. 29, 2020, now abandoned, which is a continuation-in-part of application No. 15/847,443, filed on Dec. 19, 2017, now abandoned, and a continuation-in-part of application No. 15/891,329, filed on Feb. 7, 2018, now abandoned, which is a continuation-in-part of application No. 15/860,980, filed on Jan. 3, 2018, now abandoned, which is a continuation-in-part of application No. 15/850,037, filed on Dec. 21, 2017, now abandoned, which is a continuation-in-part of application No. 15/489,716, filed on Apr. 17, 2017, now abandoned, and a continuation-in-part of application No. 15/673,368, filed on Aug. 9, 2017, now abandoned, which is a continuation-in-part of application No. 15/376,657, filed on Dec. 13, 2016, now Pat. No. 10,402,906, application No. 17/088,387, filed on Nov. 3, 2020 is a continuation-in-part of application No. 16/945,698, filed on Jul. 31, 2020, now abandoned, which is a continuation-in-part of application No. 16/915,176, filed on Jun. 29, 2020, now abandoned, which is a continuation-in-part of application No. 15/891,329, filed on Feb. 7, 2018, now abandoned, which is a continuation-in-part of application No. 15/860,980, filed on Jan. 3, 2018, now abandoned, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, application No. 17/088,387, filed on Nov. 3, 2020 is a continuation-in-part of application No. 16/945,698, filed on Jul. 31, 2020, now abandoned, which is a continuation-in-part of application No. 16/915,176, filed on Jun. 29, 2020, now abandoned, which is a continuation-in-part of application No. 15/905,041, filed on Feb. 26, 2018, now Pat. No. 10,706,063, which is a continuation-in-part of application No. 15/237,625, filed on Aug. 15, 2016, now Pat. No. 10,248,910, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation-in-part of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a continuation-in-part of application No. 15/655, 113, filed on Jul. 20, 2017, now Pat. No. 10,735,456, which is a continuation-in-part of application No. 15/616,427, filed on Jun. 7, 2017, now abandoned, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 15/683,765, filed on Aug. 22, 2017, now abandoned, which is a continuation-in-part of application No. 15/409,510, filed on Jan. 18, 2017, now abandoned, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 16/718,906, filed on Dec. 18, 2019, now Pat. No. 11,055,140, which is a continuation of application No. 15/879,182, filed on Jan. 24, 2018, now Pat. No. 10,514,954, which is a continuation-in-part of application No. 15/850,037, filed on Dec. 21, 2017, now abandoned, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 15/905,041, filed on Feb. 26, 2018, now Pat. No. 10,706,063, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/237,625, filed on Aug. 15, 2016, now Pat. No. 10,248,910, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 16/654,309, filed on Oct. 16, 2019, now abandoned, which is a continuation-in-part of application No. 15/847,443, filed on Dec. 19, 2017, now abandoned, application No. 17/088,387, filed on Nov. 3, 2020 is a continuation-in-part of application No. 16/945,698, filed on Jul. 31, 2020, now abandoned, which is a continuation-in-part of application No. 15/931,534, filed on May 13, 2020, now abandoned, which is a continuation-in-part of application No. 16/660,727, filed on Oct. 22, 2019, now Pat. No. 10,938,683, which is a continuation-in-part of application No. 15/229,476, filed on Aug. 5, 2016, now Pat. No. 10,454,791, which is a continuation-in-part of application No. 15/206,195, filed on Jul. 8, 2016, now abandoned.

(60) Provisional application No. 62/568,298, filed on Oct. 4, 2017, provisional application No. 62/568,291, filed on Oct. 4, 2017, provisional application No. 62/568,305, filed on Oct. 4, 2017, provisional application No. 62/568,312, filed on Oct. 4, 2017.

(51) Int. Cl.

| | |
|---|---|
| ***G06Q 10/067*** | (2023.01) |
| ***G06Q 30/0201*** | (2023.01) |
| ***G06Q 30/0204*** | (2023.01) |
| ***G06Q 40/04*** | (2012.01) |

(52) U.S. Cl.
CPC ..... *G06Q 30/0201* (2013.01); *G06Q 30/0205* (2013.01); *G06Q 40/04* (2013.01)

(58) Field of Classification Search
CPC .. G06N 5/022; G06Q 10/067; G06Q 30/0201; G06Q 30/0205; G06Q 40/04; G06Q 10/0672; G06Q 10/0674; G06Q 30/02011; G06Q 30/020112; G06Q 30/02012; G06Q 30/020121; G06Q 30/020122; G06Q 30/02013; G06Q 30/02014; G06Q 30/020141; G06Q 30/02015; G06Q 30/02016; G06Q 30/02017; G06Q 30/02018; G06Q 40/042; G06Q 40/0421; G06Q 40/043; G06Q 40/0431; G06Q 40/0432; G06Q 40/044; G06Q 40/045; G06Q 40/0451; G06Q 40/046; G06Q 40/047; G06Q 40/048; G06Q 40/049; G06Q 40/05; G06Q 40/051; G06Q 40/052; G06Q 40/0525; G06Q 40/053; G06Q 40/054; G06Q 40/0545; G06Q 40/055; H04L 63/1433
See application file for complete search history.

(56) References Cited

U.S. PATENT DOCUMENTS

| | | | | |
|---|---|---|---|---|
| 8,132,260 | B1 | 3/2012 | Mayer et al. | |
| 8,429,179 | B1 * | 4/2013 | Mirhaji | G06F 16/3329 707/756 |
| 2003/0041041 | A1 * | 2/2003 | Cristianini | G06N 20/00 706/12 |
| 2007/0012161 | A1 | 1/2007 | Lyles | |
| 2008/0172353 | A1 | 7/2008 | Lim et al. | |
| 2009/0043637 | A1 * | 2/2009 | Eder | G06N 7/01 705/37 |
| 2009/0164387 | A1 * | 6/2009 | Armstrong | G06F 40/30 705/37 |
| 2010/0228693 | A1 | 9/2010 | Dawson et al. | |
| 2011/0153368 | A1 * | 6/2011 | Pierre | G06Q 10/067 715/848 |
| 2011/0185432 | A1 | 7/2011 | Sandoval et al. | |
| 2012/0046992 | A1 * | 2/2012 | Hu | G06Q 30/02 705/7.29 |
| 2012/0203708 | A1 * | 8/2012 | Psota | G06Q 30/06 705/347 |
| 2013/0041921 | A1 | 2/2013 | Cooper et al. | |
| 2013/0074143 | A1 * | 3/2013 | Bu | H04L 63/1416 726/1 |
| 2013/0091539 | A1 * | 4/2013 | Khurana | H04L 63/1425 726/1 |
| 2013/0347116 | A1 | 12/2013 | Flores et al. | |
| 2014/0040975 | A1 | 2/2014 | Raleigh et al. | |
| 2014/0074826 | A1 | 3/2014 | Cooper et al. | |
| 2014/0245443 | A1 * | 8/2014 | Chakraborty | H04L 63/1425 726/23 |
| 2015/0073929 | A1 * | 3/2015 | Psota | G06Q 30/0201 705/26.2 |
| 2015/0095303 | A1 * | 4/2015 | Sonmez | G06N 5/01 707/707 |
| 2015/0379445 | A1 * | 12/2015 | Wang | G06Q 10/06311 705/7.13 |
| 2016/0071035 | A1 * | 3/2016 | Chee | G06Q 10/0635 705/7.28 |
| 2016/0125751 | A1 * | 5/2016 | Barker | G06N 20/00 434/322 |
| 2016/0203234 | A1 * | 7/2016 | Piccand | H04W 4/70 707/798 |
| 2016/0275123 | A1 | 9/2016 | Lin et al. | |
| 2017/0011037 | A1 * | 1/2017 | Qian | G06Q 50/01 |

FOREIGN PATENT DOCUMENTS

| | | | |
|---|---|---|---|
| WO | 2014159150 | A1 | 10/2014 |
| WO | 2017075543 | A1 | 5/2017 |

* cited by examiner

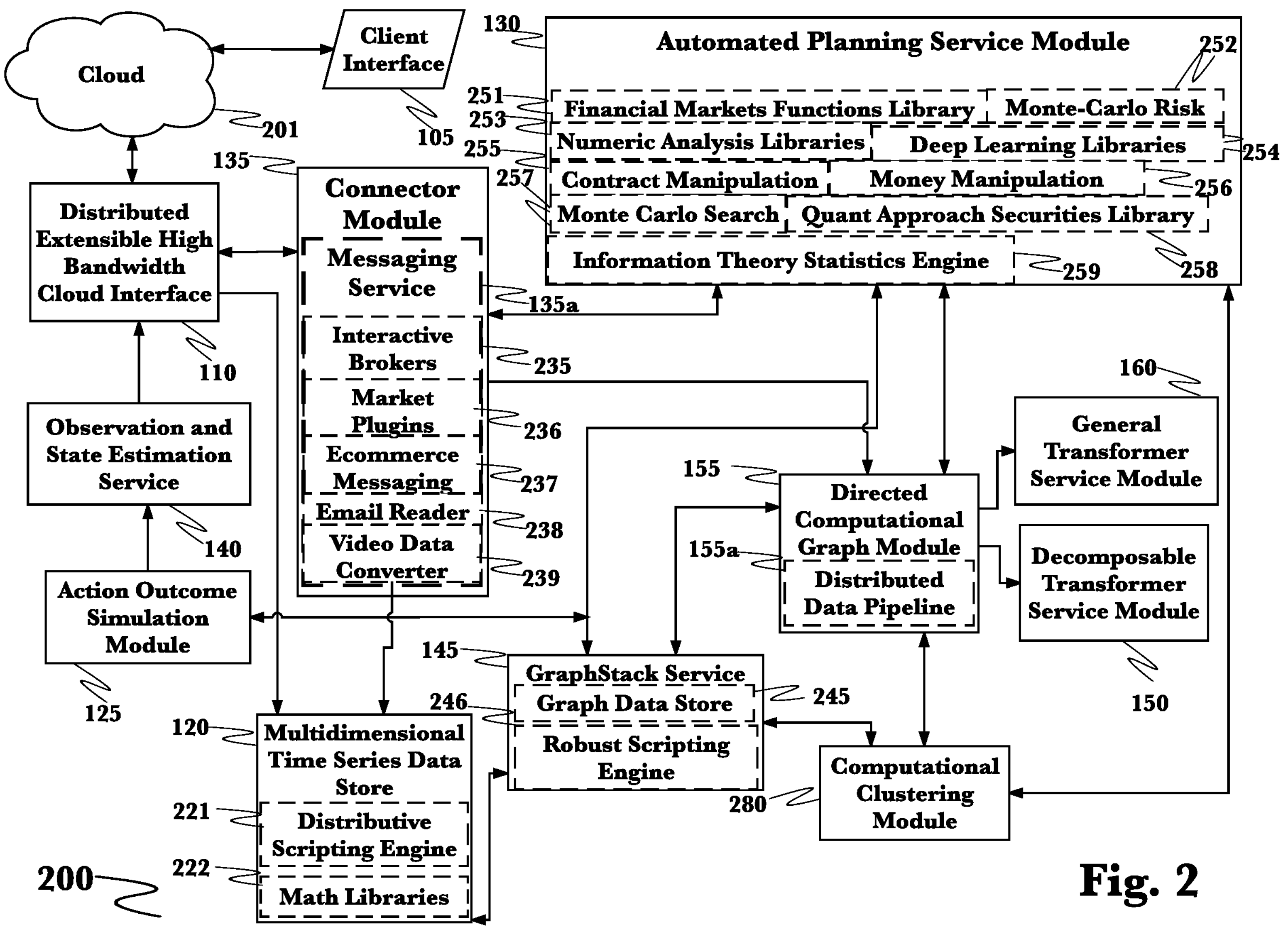
Cloud
201
Client Interface
105
Distributed Extensible High Bandwidth Cloud Interface
110
135
Connector Module
Messaging Service
135a
Interactive Brokers
235
Market Plugins
236
Ecommerce Messaging
237
Email Reader
238
Video Data Converter
239
Observation and State Estimation Service
140
Action Outcome Simulation Module
125
130
Automated Planning Service Module
252
251
253
255
257
Financial Markets Functions Library
Monte-Carlo Risk
Numeric Analysis Libraries
Deep Learning Libraries
254
Contract Manipulation
Money Manipulation
256
Monte Carlo Search
Quant Approach Securities Library
Information Theory Statistics Engine
259
258
160
General Transformer Service Module
155
Directed Computational Graph Module
155a
Distributed Data Pipeline
Decomposable Transformer Service Module
150
145
GraphStack Service
246
Graph Data Store
245
Robust Scripting Engine
280
Computational Clustering Module
120
Multidimensional Time Series Data Store
221
Distributive Scripting Engine
222
Math Libraries
200
Fig. 2

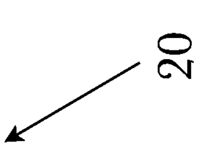
Fig. 7

INTEGRATED VALUE CHAIN RISK-BASED PROFILING AND OPTIMIZATION

CROSS-REFERENCE TO RELATED APPLICATIONS

| application No. | Date Filed | Title |
|---|---|---|
| Current application | Herewith | INTEGRATED VALUE CHAIN RISK-BASED PROFILING AND OPTIMIZATION Is a continuation-in-part: |
| 16/945,698 | Jul. 31, 2020 | UNIVERSAL COMPUTING ASSET REGISTRY which is a continuation-in-part: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING which is a continuation-in-part of: |
| 15/790,457 | Oct. 23, 2017 | DISTRIBUTABLE MODEL WITH BIASES CONTAINED WITHIN DISTRIBUTED DATA which claims benefit of, and priority to: |
| 62/568,298 | Oct. 4, 2017 | DISTRIBUTABLE MODEL WITH BIASES CONTAINED IN DISTRIBUTED DATA and is also a continuation-in-part of: |
| 15/790,327 | Oct. 23, 2017 | DISTRIBUTABLE MODEL WITH DISTRIBUTED DATA which claims benefit of, and priority to: |
| 62/568,291 | Oct. 4, 2017 | DISTRIBUTABLE MODEL WITH DISTRIBUTED DATA and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION which is a continuation-in-part of: |
| 15/091,563 U.S. Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES and is also a continuation-in-part of: |
| 14/986,536 U.S. Pat. No. 10,210,255 | Dec. 31, 2015 Issue Date Feb. 19, 2019 | DISTRIBUTED SYSTEM FOR LARGE VOLUME DEEP WEB DATA EXTRACTION and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | INTEGRATED VALUE CHAIN RISK-BASED PROFILING AND OPTIMIZATION Is a continuation-in-part: |
| 16/945,698 | Jul. 31, 2020 | UNIVERSAL COMPUTING ASSET REGISTRY which is a continuation-in-part of: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING which is a continuation-in-part of: |
| 15/616,427 | Jun. 7, 2017 | RAPID PREDICTIVE ANALYSIS OF VERY LARGE DATA SETS USING AN ACTOR- |

-continued

| application No. | Date Filed | Title |
|---|---|---|
| | | DRIVEN DISTRIBUTED COMPUTATIONAL GRAPH which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | INTEGRATED VALUE CHAIN RISK-BASED PROFILING AND OPTIMIZATION Is a continuation-part-of: |
| 16/945,698 | Jul. 31, 2020 | UNIVERSAL COMPUTING ASSET REGISTRY which is a continuation-part-of: |
| 16/864,133 | Apr. 30, 2020 | MULTI-TENANT KNOWLEDGE GRAPH DATABASES WITH DYNAMIC SPECIFICATION AND ENFORCEMENT OF ONTOLOGICAL DATA MODELS which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING which is a continuation-in-part of: |
| 15/489,716 | Apr. 17, 2017 | REGULATION BASED SWITCHING SYSTEM FOR ELECTRONIC MESSAGE ROUTING which is a continuation-in-part of: |
| 15/409,510 | Jan. 18, 2017 | MULTI-CORPORATION VENTURE PLAN VALIDATION EMPLOYING AN ADVANCED DECISION PLATFORM which is a continuation-in-part of: |
| 15/379,899 | Dec. 15, 2016 | INCLUSION OF TIME SERIES GEOSPATIAL MARKERS IN ANALYSES EMPLOYING AN ADVANCED CYBER-DECISION PLATFORM which is a continuation-in-part of: |
| 15/376,657 U.S. Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| Current application | Herewith | INTEGRATED VALUE CHAIN RISK-BASED PROFILING AND OPTIMIZATION Is a continuation-part-of: |
| 16/945,698 | Jul. 31, 2020 | UNIVERSAL COMPUTING ASSET REGISTRY which is a continuation-part-of: |
| 16/915,176 | Jun. 29, 2020 | RISK PROFILING AND RATING OF EXTENDED RELATIONSHIPS USING ONTOLOGICAL DATABASES which is a continuation-in-part of: |

-continued

| application No. | Date Filed | Title |
|---|---|---|
| 15/847,443 | Dec. 19, 2017 | SYSTEM AND METHOD FOR AUTOMATIC CREATION OF ONTOLOGICAL DATABASES AND SEMANTIC SEARCHING |
| Current application | Herewith | INTEGRATED VALUE CHAIN RISK-BASED PROFILING AND OPTIMIZATION |
| | | Is a continuation-part-of: |
| 16/945,698 | Jul. 31, 2020 | UNIVERSAL COMPUTING ASSET REGISTRY |
| | | which is a continuation-part-of: |
| 16/915,176 | Jun. 29, 2020 | RISK PROFILING AND RATING OF EXTENDED RELATIONSHIPS USING ONTOLOGICAL DATABASES |
| | | which is a continuation-in-part of: |
| 15/891,329 | Feb. 7, 2018 | AUTOMATED VISUAL INFORMATION CONTEXT AND MEANING COMPREHENSION SYSTEM |
| | | which is a continuation-in-part of: |
| 15/860,980 | Jan. 3, 2018 | COLLABORATIVE ALGORITHM DEVELOPMENT, DEPLOYMENT, AND TUNING PLATFORM |
| | | which is a continuation-in-part of: |
| 15/850,037 | Dec. 21, 2017 | ADVANCED DECENTRALIZED FINANCIAL DECISION PLATFORM |
| | | which is a continuation-in-part of: |
| 15/673,368 | Aug. 9, 2017 | AUTOMATED SELECTION AND PROCESSING OF FINANCIAL MODELS |
| | | which is a continuation-in-part of: |
| 15/376,657 | Dec. 13, 2016 | QUANTIFICATION FOR INVESTMENT |
| U.S. Pat. No. | Issue Date | VEHICLE MANAGEMENT EMPLOYING |
| 10,402,906 | Sep. 3, 2019 | AN ADVANCED DECISION PLATFORM |
| Current application | Herewith | INTEGRATED VALUE CHAIN RISK-BASED PROFILING AND OPTIMIZATION |
| | | Is a continuation-part-of: |
| 16/945,698 | Jul. 31, 2020 | UNIVERSAL COMPUTING ASSET REGISTRY |
| | | which is a continuation-part-of: |
| 16/915,176 | Jun. 29, 2020 | RISK PROFILING AND RATING OF EXTENDED RELATIONSHIPS USING ONTOLOGICAL DATABASES |
| | | which is a continuation-in-part of: |
| 15/891,329 | Feb. 7, 2018 | AUTOMATED VISUAL INFORMATION CONTEXT AND MEANING COMPREHENSION SYSTEM |
| | | which is a continuation-in-part of: |
| 15/860,980 | Jan. 3, 2018 | COLLABORATIVE ALGORITHM DEVELOPMENT, DEPLOYMENT, AND TUNING PLATFORM |
| | | which is a continuation-in-part of: |
| 15/850,037 | Dec. 21, 2017 | ADVANCED DECENTRALIZED FINANCIAL DECISION PLATFORM |
| | | which is also a continuation-in-part of: |
| 15/489,716 | Apr. 17, 2017 | REGULATION BASED SWITCHING SYSTEM FOR ELECTRONIC MESSAGE ROUTING |
| Current application | Herewith | INTEGRATED VALUE CHAIN RISK-BASED PROFILING AND OPTIMIZATION |
| | | Is a continuation-part-of: |
| 16/945,698 | Jul. 31, 2020 | UNIVERSAL COMPUTING ASSET REGISTRY |
| | | which is a continuation-part-of: |
| 16/915,176 | Jun. 29, 2020 | RISK PROFILING AND RATING OF EXTENDED RELATIONSHIPS USING ONTOLOGICAL DATABASES |
| | | which is a continuation-in-part of: |
| 15/891,329 | Feb. 7, 2018 | AUTOMATED VISUAL INFORMATION CONTEXT AND MEANING COMPREHENSION SYSTEM |
| | | which is a continuation-in-part of: |
| 15/860,980 | Jan. 3, 2018 | COLLABORATIVE ALGORITHM DEVELOPMENT, DEPLOYMENT, AND TUNING PLATFORM |
| | | which is a continuation-in-part of: |
| 15/788,002 | Oct. 19, 2017 | ALGORITHM MONETIZATION AND EXCHANGE PLATFORM |
| | | which claims priority to, and benefit of: |
| 62/568,305 | Oct. 4, 2017 | ALGORITHM MONETIZATION AND |

-continued

| application No. | Date Filed | Title |
|---|---|---|
| | | EXCHANGE PLATFORM |
| | | and is also a continuation-in-part of: |
| 15/787,601 | Oct. 18, 2017 | METHOD AND APPARATUS FOR CROWDSOURCED DATA GATHERING, EXTRACTION, AND COMPENSATION |
| | | which claims priority to, and benefit of: |
| 62/568,312 | Oct. 4, 2017 | METHOD AND APPARATUS FOR CROWDSOURCED DATA GATHERING, EXTRACTION, AND COMPENSATION |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| Current application | Herewith | INTEGRATED VALUE CHAIN RISK-BASED PROFILING AND OPTIMIZATION |
| | | Is a continuation-part-of: |
| 16/945,698 | Jul. 31, 2020 | UNIVERSAL COMPUTING ASSET REGISTRY |
| | | which is a continuation-part-of: |
| 16/915,176 | Jun. 29, 2020 | RISK PROFILING AND RATING OF EXTENDED RELATIONSHIPS USING ONTOLOGICAL DATABASES |
| | | which is a continuation-in-part of: |
| 15/905,041<br>U.S. Pat. No.<br>10,706,063 | Feb. 26, 2018<br>Issue Date<br>Jul. 7, 2020 | AUTOMATED SCALABLE CONTEXTUAL DATA COLLECTION AND EXTRACTION SYSTEM |
| | | which is a continuation-in-part of: |
| 15/237,625<br>U.S. Pat. No.<br>10,248,910 | Aug. 15, 2016<br>Issue Date<br>Apr. 2, 2019 | DETECTION MITIGATION AND REMEDIATION OF CYBERATTACKS EMPLOYING AN ADVANCED CYBER-DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | SYSTEM FOR THE PRIORITIZATION AND DYNAMIC PRESENTATION OF DIGITAL CONTENT |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/777,270 | Jan. 30, 2020 | CYBERSECURITY PROFILING AND RATING USING ACTIVE AND PASSIVE EXTERNAL RECONNAISSANCE |
| | | which is a continuation-in-part of: |
| 16/720,383 | Dec. 19, 2019 | RATING ORGANIZATION CYBERSECURITY USING ACTIVE AND PASSIVE EXTERNAL RECONNAISSANCE |
| | | which is a continuation of: |
| 15/823,363<br>U.S. Pat. No.<br>10,560,483 | Nov. 27, 2017<br>Issue Date<br>Feb. 11, 2020 | RATING ORGANIZATION CYBERSECURITY USING ACTIVE AND PASSIVE EXTERNAL RECONNAISSANCE |
| | | which is a continuation-in-part of: |
| 15/725,274<br>U.S. Pat. No.<br>10,609,079 | Oct. 4, 2017<br>Issue Date<br>Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113<br>U.S. Pat. No.<br>10,735,456 | Jul. 20, 2017<br>Issue Date<br>Aug. 4, 2020 | ADVANCED CYBERSECURITY THREAT MITIGATION USING BEHAVIORAL AND DEEP ANALYTICS |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | INTEGRATED VALUE CHAIN RISK-BASED PROFILING AND OPTIMIZATION |

-continued

| application No. | Date Filed | Title |
|---|---|---|
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/777,270 | Jan. 30, 2020 | CYBERSECURITY PROFILING AND RATING USING ACTIVE AND PASSIVE EXTERNAL RECONNAISSANCE |
| | | which is a continuation-in-part of: |
| 16/720,383 | Dec. 19, 2019 | RATING ORGANIZATION CYBERSECURITY USING ACTIVE AND PASSIVE EXTERNAL RECONNAISSANCE |
| | | which is a continuation of: |
| 15/823,363<br>U.S. Pat. No.<br>10,560,483 | Nov. 27, 2017<br>Issue Date<br>Feb. 11, 2020 | RATING ORGANIZATION CYBERSECURITY USING ACTIVE AND PASSIVE EXTERNAL RECONNAISSANCE |
| | | which is a continuation-in-part of: |
| 15/725,274<br>U.S. Pat. No.<br>10,609,079 | Oct. 4, 2017<br>Issue Date<br>Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113<br>U.S. Pat. No.<br>10,735,456 | Jul. 20, 2017<br>Issue Date<br>Aug. 4, 2020 | ADVANCED CYBERSECURITY THREAT MITIGATION USING BEHAVIORAL AND DEEP ANALYTICS |
| | | which is also a continuation-in-part of: |
| 15/237,625<br>U.S. Pat. No.<br>10,248,910 | Aug. 15, 2016<br>Issue Date<br>Apr. 2, 2019 | DETECTION MITIGATION AND REMEDIATION OF CYBERATTACKS EMPLOYING AN ADVANCED CYBER-DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 15/683,765 | Aug. 22, 2017 | PREDICTIVE LOAD BALANCING FOR A DIGITAL ENVIRONMENT |
| | | which is a continuation-in-part of: |
| 15/409,510 | Jan. 18, 2017 | MULTI-CORPORATION VENTURE PLAN VALIDATION EMPLOYING AN ADVANCED DECISION PLATFORM |
| | | which is a continuation-in-part of: |
| 15/379,899 | Dec. 15, 2016 | INCLUSION OF TIME SERIES GEOSPATIAL MARKERS IN ANALYSES EMPLOYING AN ADVANCED CYBER-DECISION PLATFORM |
| | | which is a continuation-in-part of: |
| 15/376,657<br>U.S. Pat. No.<br>10,402,906 | Dec. 13, 2016<br>Issue Date<br>Sep. 3, 2019 | QUANTIFICATION FOR INVESTMENT VEHICLE MANAGEMENT EMPLOYING AN ADVANCED DECISION PLATFORM |
| | | which is a continuation-in-part of: |
| 15/237,625<br>U.S. Pat. No.<br>10,248,910 | Aug. 15, 2016<br>Issue Date<br>Apr. 2, 2019 | DETECTION MITIGATION AND REMEDIATION OF CYBERATTACKS EMPLOYING AN ADVANCED CYBER-DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |

-continued

| application No. | Date Filed | Title |
|---|---|---|
| | | which is a continuation-in-part of: |
| 16/718,906 | Dec. 18, 2019 | PLATFORM FOR HIERARCHY COOPERATIVE COMPUTING |
| | | which is a continuation of: |
| 15/879,182 | Jan. 24, 2018 | PLATFORM FOR HIERARCHY |
| U.S. Pat. No. | Issue Date | COOPERATIVE COMPUTING |
| 10,514,954 | Dec. 24, 2019 | which is a continuation-in-part of: |
| 15/850,037 | Dec. 21, 2017 | ADVANCED DECENTRALIZED FINANCIAL DECISION PLATFORM |
| | | which is a continuation-in-part of: |
| 15/673,368 | Aug. 9, 2017 | AUTOMATED SELECTION AND PROCESSING OF FINANCIAL MODELS |
| | | which is a continuation-in-part of: |
| 15/376,657 | Dec. 13, 2016 | QUANTIFICATION FOR INVESTMENT |
| U.S. Pat. No. | Issue Date | VEHICLE MANAGEMENT EMPLOYING |
| 10,402,906 | Sep. 3, 2019 | AN ADVANCED DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/718,906 | Dec. 18, 2019 | PLATFORM FOR HIERARCHY COOPERATIVE COMPUTING |
| | | which is a continuation of: |
| 15/879,182 | Jan. 24, 2018 | PLATFORM FOR HIERARCHY |
| U.S. Pat. No. | Issue Date | COOPERATIVE COMPUTING |
| 10,514,954 | Dec. 24, 2019 | which is a continuation-in-part of: |
| 15/850,037 | Dec. 21, 2017 | ADVANCED DECENTRALIZED FINANCIAL DECISION PLATFORM |
| | | which is a continuation-in-part of: |
| 15/489,716 | Apr. 17, 2017 | REGULATION BASED SWITCHING SYSTEM FOR ELECTRONIC MESSAGE ROUTING |
| | | which is a continuation-in-part of: |
| 15/409,510 | Jan. 18, 2017 | MULTI-CORPORATION VENTURE PLAN VALIDATION EMPLOYING AN ADVANCED DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 15/905,041 | Feb. 28, 2018 | AUTOMATED SCALABLE CONTEXTUAL |
| U.S. Pat. No. | Issue Date | DATA COLLECTION AND EXTRACTION |
| 10,706,063 | Jul. 7, 2020 | SYSTEM |
| | | which is a continuation-in-part of: |
| 15/237,625 | Aug. 15, 2016 | DETECTION MITIGATION AND |
| U.S. Pat. No. | Issue Date | REMEDIATION OF CYBERATTACKS |
| 10,248,910 | Apr. 2, 2019 | EMPLOYING AN ADVANCED CYBER-DECISION PLATFORM |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/191,054 | Nov. 14, 2018 | SYSTEM AND METHOD FOR |
| U.S. Pat. No. | Issue Date | COMPREHENSIVE DATA LOSS |
| 10,681,074 | Jun. 9, 2020 | PREVENTION AND COMPLIANCE MANAGEMENT |

-continued

| application No. | Date Filed | Title |
|---|---|---|
| | | which is a continuation-in-part of: |
| 15/655,113 | Jul. 20, 2017 | ADVANCED CYBERSECURITY THREAT |
| U.S. Pat. No. | Issue Date | MITIGATION USING BEHAVIORAL AND |
| 10,735,456 | Aug. 4, 2020 | DEEP ANALYTICS |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/654,309 | Oct. 16, 2019 | SYSTEM AND METHOD AUTOMATED ANALYSIS OF LEGAL DOCUMENTS WITHIN AND ACROSS SPECIFIC FIELDS |
| | | which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct. 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/654,309 | Oct. 16, 2019 | SYSTEM AND METHOD AUTOMATED ANALYSIS OF LEGAL DOCUMENTS WITHIN AND ACROSS SPECIFIC FIELDS |
| | | which is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/489,716 | Apr. 17, 2017 | REGULATION BASED SWITCHING SYSTEM FOR ELECTRONIC MESSAGE ROUTING |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY |

-continued

| application No. | Date Filed | Title |
|---|---|---|
| | | LARGE DATA SETS USING AN ACTOR-DRIVEN DISTRIBUTED COMPUTATIONAL GRAPH |
| Current application | Herewith | INTEGRATED VALUE CHAIN RISK-BASED PROFILING AND OPTIMIZATION |
| | | Is a continuation-in-part of: |
| 16/945,698 | Jul. 31, 2020 | CYBERSECURITY PROFILING AND RATING USING ACTIVE AND PASSIVE EXTERNAL RECONNAISSANCE |
| | | which is a continuation-in-part of: |
| 15/931,534 | May 13, 2020 | SECURE POLICY-CONTROLLED PROCESSING AND AUDITING ON REGULATED DATA SETS |
| | | which is a continuation-in-part of: |
| 16/660,727 | Oct. 22, 2019 | HIGHLY SCALABLE DISTRIBUTED CONNECTION INTERFACE FOR DATA CAPTURE FROM MULTIPLE NETWORK SERVICE SOURCES |
| | | which is a continuation of: |
| 15/229,476 U.S. Pat. No. 10,454,791 | Aug. 5, 2016 Issue Date Oct. 22, 2019 | HIGHLY SCALABLE DISTRIBUTED CONNECTION INTERFACE FOR DATA CAPTURE FROM MULTIPLE NETWORK SERVICE SOURCES |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |

the entire specification of each of which is incorporated herein by reference.

BACKGROUND

Field of the Art

The disclosure relates to the field of data analytics, and more particularly to the field of value chain analysis, risk, management, and optimization.

Discussion of the State of the Art

A world-class global value chain is a major competitive advantage for businesses, but the technology and processes that enable end-to-end value chain (also referred to as integrated value chain), and the customer demands that guide it, are changing more rapidly than ever. Existing supply chain management (SCM) systems often capture data such as how much product a company purchases, how many orders a company fulfills, and number of returns, but these exist primarily between directly interfacing organizations. These systems are often not integrated to other processes in the value chain, making data and information sharing within and across value chains difficult to do. Further, the current approach makes reasoning about risk from transitive dependencies infeasible (e.g. a firm may believe its reduced risk by diversifying suppliers without realizing its suppliers have a common supplier whose disruption could mean an inability to produce its own goods). We define the term “Tier-N” to refer to these transitive relationships: one’s own suppliers are it’s “Tier-1” suppliers, the suppliers of “Tier-1” suppliers are the original firm’s “Tier-2” suppliers, etc. The mapping of such data is problematic today, in no small part due to the plurality of data sources required to inform relationships across entities. For example, leading data providers’ ability to do “Tier-N” analysis today is largely dependent on their reported trade and linkage data, which often has serious restrictions on data usage and disclosure, and lacks contextual enrichment from other private or public sources. The core challenges faced by modern organizations revolve around increasing rates of change and competition, and the increasing importance of disruption risk identification, quantification, and management. By utilizing an integrated ecosystem, enterprises at all stages of the value chain can more quickly respond to changes in the production or distribution process, changes in demand, or other external factors affecting the integrated value chain.

What is needed is a system and method for gathering and analyzing the value chain relationships between legal entities, people, systems, and real and intangible assets, which provides the ability to layer private data from paid vendors with end-user owned and public records data to enable more comprehensive, contextualized, and complete analysis of the value chain.

SUMMARY

Accordingly, the inventor has conceived and reduced to practice, a system and method for gathering and analyzing the value chain relationships between legal entities, people, systems, and real and intangible assets using a temporospatial knowledge graph of the integrated value chain. The system provides the ability to layer private data from paid vendors with end-user owned and public records data to enable more comprehensive, contextualized and complete representations of the underlying value chain. Data analysis techniques, such as deep learning and machine learning, are performed on the knowledge graph and its underlying data set, in conjunction with simulation and modeling, to analyze the value chain, including generation of a risk profile for an entity’s value chain, characterization of particular risks, and recommendation of potential optimization options to remediate the identified risks.

According to a preferred embodiment, a system for gathering and analyzing the value chain relationships between legal entities, people, systems, and real and intangible assets using a temporospatial knowledge graph of the integrated value chain, is disclosed, comprising: a computing device comprising a memory, a processor, and a non-volatile data storage device; an integrated value chain ontological database comprising value chain data; and a directed computational graph module comprising a first plurality of programming instructions stored in a memory of, and operating on a processor of, a computing device, wherein the first plurality of programming instructions, when operating on the processor, cause the computing device to: analyze the integrated value chain ontological database for risk query related information, the query-related information comprising entities, individuals, locations, and topics associated with the subject; and create a weighted and directed temporospatial knowledge graph, the weighted and directed temporospatial knowledge graph comprising nodes representing the entities, individuals, locations, and topics associated with the subject and edges representing the relationships to the nodes in relation to the subject or the associated nodes; and a risk optimization engine comprising a second plurality of programming instructions stored in a memory of, and operating on a processor of, a computing device, wherein the second plurality of programming instructions, when operating on the processor, cause the computing device to: identify paths or clusters of a subset of the weighted and directed temporospatial knowledge graph which meet a pre-determined risk threshold wherein the paths or clusters represent risk categories; perform one or more simulations using data from at least part of the integrated value chain ontological database wherein: the simulations models a disruption event to determine a probability and disruption impact associated with the disruption event; the simulation models alternative actions to determine the feasibility of the alternative action; and assign a risk score to each identified risk category, based on the probability and disruption impact associated with that risk.

According to another preferred embodiment, a method for gathering and analyzing the value chain relationships between legal entities, people, systems, and real and intangible assets using a temporospatial knowledge graph of the integrated value chain is disclosed, comprising the steps of: analyzing the integrated value chain ontological database for risk query related information, the query-related information comprising entities, individuals, locations, and topics associated with the subject; creating a weighted and directed temporospatial knowledge graph, the weighted and directed temporospatial knowledge graph comprising nodes representing the entities, individuals, locations, and topics associated with the subject and edges representing the relationships to the nodes in relation to the subject or the associated nodes; identifying paths or clusters of a subset of the weighted and directed temporospatial knowledge graph which meet a pre-determined risk threshold wherein the paths or clusters represent risk categories; performing one or more simulations using data from at least part of the integrated value chain ontological database wherein: the simulations models a disruption event to determine a probability and disruption impact associated with the disruption event; the simulation models alternative actions to determine the feasibility of the alternative action; and assigning a risk score to each identified risk category, based on the probability and disruption impact associated with that risk.

According to one aspect, the system further comprises an asset registry manager, wherein the asset registry manager: scan ingested data for provenance metadata; store the provenance metadata on the non-volatile storage device; and send the provenance metadata to an automated ontology engine.

According to one aspect, the system further comprises an automated ontology engine, wherein the automated ontology engine: receive data collected using web-scrapers and data-extraction tools, from all available data sources; and receive the provenance metadata from the asset registry manager; run the collected data through a variety of tools to append the data with temporal, geospatial, information reliability, contextual metadata, and provenance metadata using machine learning algorithms and ontological axioms configuration; and store the appended data in the integrated value chain ontological database.

According to one aspect, wherein the data sources includes at least parts of public, private, and proprietary data sources.

According to one aspect, wherein the simulation is a Monte Carlo simulation.

According to one aspect, wherein the simulation data further comprises partial synthetic data.

According to one aspect, wherein the simulations model a fraud event, and assigns a fraud risk score to a fraud category.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 2 is a block diagram of an advanced cyber decision platform in an exemplary configuration for use in investment vehicle management.

FIG. 7 is a block diagram illustrating an exemplary logical architecture for a client device.

DETAILED DESCRIPTION

Figure 1:
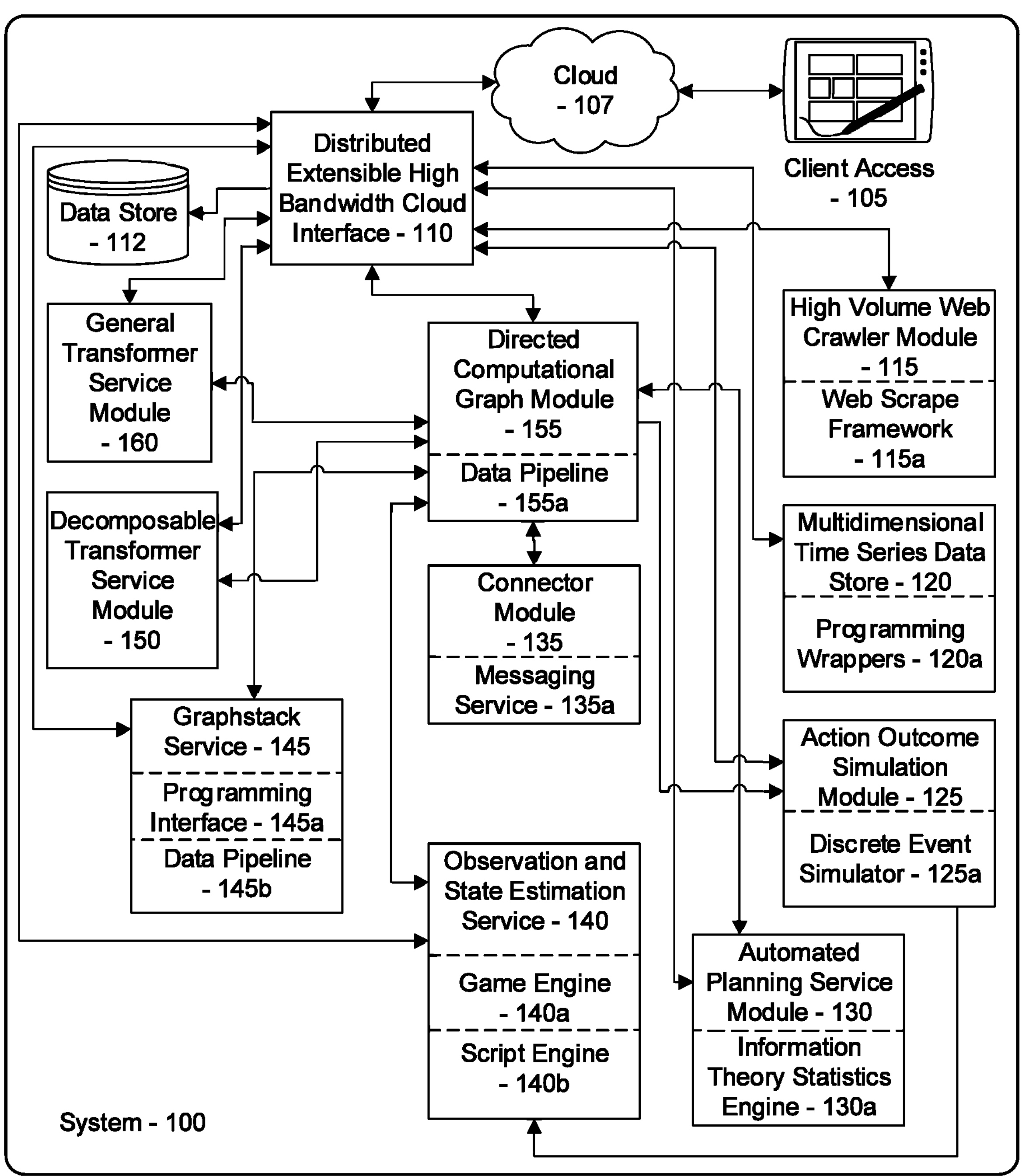
FIG. 1 is a block diagram of an exemplary system architecture for an advanced cyber decision platform.

The inventor has conceived, and reduced to practice, a system and method for gathering and analyzing the value chain relationships between legal entities, people, systems, and real and intangible assets using a temporospatial knowledge graph of the integrated value chain. The system provides the ability to layer private data from paid vendors with end-user owned and public records data to enable more comprehensive, contextualized and complete representations of the underlying value chain. Data analysis techniques, such as deep learning and machine learning, are performed on the knowledge graph and its underlying data set, in conjunction with simulation and modeling, to analyze the value chain, including generation of a risk profile for an entity's value chain and potential optimization options to remediate the identified risks.

The system scans for and ingests a plurality of information relating to end-to-end value chains from multiple domains, individual people, legal entities, and both tangible and intangible assets such as software and its components or intellectual property. The system may ingest value chain data about what firms buy and sell across intangible assets and tangible assets, ideally at the level of individual transactions and how transactions link to human and natural resources. The data that is currently publicly available is inadequate for this purpose, so this system may allow for select entities to join in a partner network which may collectively have access to representative samples of this data for firms and consumers alike. Value chain information may include, but is not limited to total sales, total returns, product cost, raw material price and availability, transit and shipping routes, bills of materials, enterprise location, trade rules and regulations, political climate, energy demands, fuel costs, intellectual property, legal contracts, and consumer reviews at an individual level or in the aggregate. A directed computational graph (DCG) module orchestrates a data ingestion workflow that ingests, extracts, validates, and enriches the data using a combination of natural language processors, ontological processors, provenance metadata extraction, and machine learning to train an algorithm for categorization and labelling of data. The model(s) that can be built with this data will be enable better understanding of business cycles and long-term growth and navigate technological change.

Once trained, the algorithm can be used to create a detailed temporospatial weighted and directed knowledge graph that maps the global value chain for the purpose of human comprehension and further system analysis. A sufficiently detailed map of the global production network or integrated value chain is required to support a variety of historical, near-term (i.e. empirical extrapolative) predictions, and simulation-based representations of the economic sphere. In addition, the system makes use of a data registry where specialized secondary databases and indexes may exist for common lookups. The system captures relationships between entities and is linked to a directed computational graph-based ingest system which further captures metadata around provenance and model provenance. This supports understanding the nature of the data assembled (e.g. sources, how old/stale, observed vs modeled) such that planning can address observable and expressly non-observable phenomena in modeling linked to the ultimately related business. The modeling approach supports selective incorporation of data sets, such that end users and modelers may make a flexible fusion of data sets and train associated models to reflect their commercial and business priorities. To enable such analysis, the system utilizes customizable and entity-centric behavioral analysis tools further enhanced with simulation modeling, graph based deep learning, and a massive, highly scalable multidimensional time series data store.

A knowledge-graph-based mapping of the global value chain supports several types of analysis, for example the exploration of dependencies which emerge from such a representation in a way that enables scenario planning, especially in the context of disruptions. Disruptions that affect the integrated value chain such as natural disasters, pandemics, geopolitical unrest, and the like are referred to as value chain shocks and can have massive impacts on both complex and simple projects, especially when both tangible and intangible goods are involved and require co-integrated development. These disruptions highlight that modern value chains are highly-interdependent, time-sensitive systems, and must contain enough schedule slack for common disruptions, plus resilience against broader attacks or unforeseen shocks. The system may consider both "time to survive" and "time to recover" and ideally a company needs the time to survive to exceed its suppliers' time to recover to be resilient in a given scenario. This system goes far beyond simple corporate hierarchy mappings being done by today's firms like Refinitiv, Dun and Bradstreet, or Sayari. The system leverages highly scalable and extensible ingest, processing, and storage of data form multiple sources as well as data unification (for multi-data model support) with ad hoc analytics and visualization at scale, models for missingness and synthetic data (specific techniques per data model), and external perspective on decision making.

Environmental, Social and Corporate Governance (ESG) tracking is linked closely to this same global value chain network mapping. A variety of entities, from banks to investors to regulators, are seeking to better understand the degree to which businesses are linked to the production networks which may have varying degrees of external costs imposed upon society (e.g., questions such as "how is bank lending impacting the transition to a greener economy?"). To answer such questions the system may leverage public and private information on small, non-public businesses (both real and/or simulated by system tools and/or synthetically generated via tools like Snorkel). As ESG metrics are hardly standardized, and these industry-wide efforts are hindered by self-reported, unnormalized data and self-determined goals. The use of new open, public, and alternative data sets coupled with major data vendors (e.g. Refinitive, Dun and Bradstreet, Bloomberg, etc.) proprietary data and with simulations and synthetic data offers immense potential. Simulation tools and data can be combined to model and approximate the role of green programs, along with sustainability linked capital allocation and divestment strategies, in transitioning towards a low-carbon portfolio of business relationships or investments. This approach enables a bottom-up understanding of quantifiable and realistic ESG benefits that are supported by access to up-to-date company data using parametric studies to consider "what-if" scenarios by end-users more easily.

Even traditional concepts of supply chain modeling and risk management are not limited to complex examples. Simple supply chains such as masks, gloves, and other personal protective equipment (PPE) have been demonstrably shown as brittle during the recent Covid-19 stressors. As the supply chain of PPE experienced disruptions, the system diverged from its steady state behavior, resulting in massive dislocations in the supply chain due to tail risk acceleration, wherein demand experienced more than a three standard deviation change from the mean in a very short period of time. The existence of an advanced temporospatial knowledge graph mapping the integrated value chain during the onset of the global pandemic would have allowed individual entities to explore and identify entity specific value chain risks associated with the pandemic as well as possible value chain optimizations to mitigate effects of the global disruption. The value chain map contains spatial data which can be used to identify locational risks in the value chain. The initial outbreak of pandemic was located in the Wuhan province of China and spread and grew outwards from there. The mapped global integrated value chain could be used to identify value chain actors such as raw material suppliers, manufacturers, and transport and shipping providers located in Wuhan and neighboring provinces to categorize potential regional value chain risks. China is the leading manufacturer of PPE and this system may identify there is a locality risk in the PPE value chain if China was to implement a lockdown or if its workforce was greatly reduced due to illness. The map would also provide insight into the number and frequency of PPE orders as well as the available PPE supply and manufacturing throughput. Additionally, manufacturing infrastructure such as factory machines, processes, and workforce are mapped into the global value chain along with intangible goods such software and its components. The system can process the above information and recommend optimizations that make companies more robust against value chain disruptions. For example, the system may identify (through the generative modeling approaches described above) both the supply-side and demand-side shock in regards to PPE coupled with available manufacturing infrastructure data and exhaustive simulation to identify an optimization plan that suggests a certain company can use its existing manufacturing infrastructure to pivot towards producing PPE in order to capitalize on the sudden growth of demand for PPE with the minimum capital expenditure to make the transition financially and logistically feasible.

An additional use for the described data infrastructure and knowledge base is to determine potential use cases associated with fraud between individuals and entities interacting. Fraud is quickly evolving with an increasingly fragmented and global value chain. Massive amounts of funding are available for economic development, stimulus, or incentive programs, and there have been recent cases of fraud relating to payroll protection (e.g. SBA PPP loans) and disaster remediation (e.g. FEMA relief). This may be particularly useful to issuers of credit and risk management and relief organizations or agencies who are concerned about this type of fraud. The system may provide an interactive portal to manually explore and inspect common historical, inferred, or simulated precursors to fraud. This may be implemented on real data and synthetic data to impact program design as well as claims and fraud investigation. Improved mapping of entities and flows can identify structural anomalies (e.g. strange relationships between individuals and entities) as well as businesses doing better than their peers by unexplainable deltas. In addition, performance deviations of individuals or entities from either dependent or mutually-dependent trade. The system may support behavioral and flow-based detections, but is distinct in is ability to use real, synthetic, and simulated data (in whole or in part) concurrently. Additional advanced time-series monitoring and alerting capabilities using event-oriented timeseries capabilities which can operate on financial flows at scale.

An additional use case is the development of risk management processes to manage expected rewards versus risk exposures to different factors. Dynamic risk determination and allocation is lacking in most, if not all, current supply chain management infrastructures. The ability to define and develop forward-looking assistance such as risk appetite and allocation for trade, credit, research, political risk, and manufacturing or logistics use cases is unique, and is accomplished via a mix of predictive and generative modeling on combinations of real, synthetic, and simulated data. This can leverage traditional data sources such as entity-to-entity trade flow data, but may also leverage other time-dependent and time-independent metrics on single entities, bilateral relationships, multiple entities or groups to look at flows, topologies or other metrics. As an example, such actions may include recommending adjustments to customer credit limits, extend new offers, initiate vendor security reviews, initiate or cancel fraud investigations or audits, modify reserve capital (e.g. reserved capital for expected claims in insurance or bad debt for lenders) in times of economic disruptions based on entity-specific, category, integrated value-chain risks, and both supply and demand-side shock propagation modeling.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information.

"Value chain" or "integrated value chain" are used herein interchangeably to mean a system of organizations, people, activities, information, and resources involved in supplying a product or service to a consumer. Value activities often involve the transformation of natural resources, raw materials, and components into a finished product that is delivered to the end customer. Additionally, the integrated value chain as mapped by the disclosed system comprises information regarding ecological, biological, and political regulations governing natural resources and international trade, information about tangible and intangible goods such as digital value chain for software and other intellectual property assets, components, computing resources, and software bill of materials and specification. Furthermore, the value chain may include information about banking and payment partners in regards to money laundering, fraud, economic activity indices, and consumer behavior such as purchasing tendencies and consumer reviews.

"Supply chain" as used herein is a subset of the value chain focused primarily on the delivery and sales of a good or service, including such functions as product development, inbound and outbound logistics, marketing, operations, distribution, finance, and customer service.

Conceptual Architecture

FIG. 1 is a block diagram of an advanced cyber decision platform (ACDP) for external network reconnaissance and cybersecurity rating. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™ CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135*a* needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph.

The high volume web crawling module 115 uses multiple server hosted preprogrammed web spiders, which while autonomously configured are deployed within a web scraping framework 115*a* of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120*a* for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, and additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may be discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155*a* to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

FIG. 2 is a block diagram of an advanced cyber decision platform in an exemplary configuration for use in investment vehicle management 200. The advanced cyber decision platform 100 previously disclosed in co-pending application Ser. No. 15/141,752 and applied in a role of cybersecurity in co-pending application Ser. No. 15/237,625, when programmed to operate as quantitative trading decision platform, is very well suited to perform advanced predictive analytics and predictive simulations 202 to produce investment predictions. Much of the trading specific programming functions are added to the automated planning service module 130 of the modified advanced cyber decision platform 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135*a* routines, due to ease of programming, are augmented with interactive broker functions 235, market data source plugins 236, e-commerce messaging interpreters 237, business-practice aware email reader 238 and programming libraries to extract information from video data sources 239.

Other modules that make up the advanced cyber decision platform may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the C++ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155*a* supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, first disclosed in ¶067 of co-pending application Ser. No. 14/925,974 which is incorporated herein by reference, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 3:
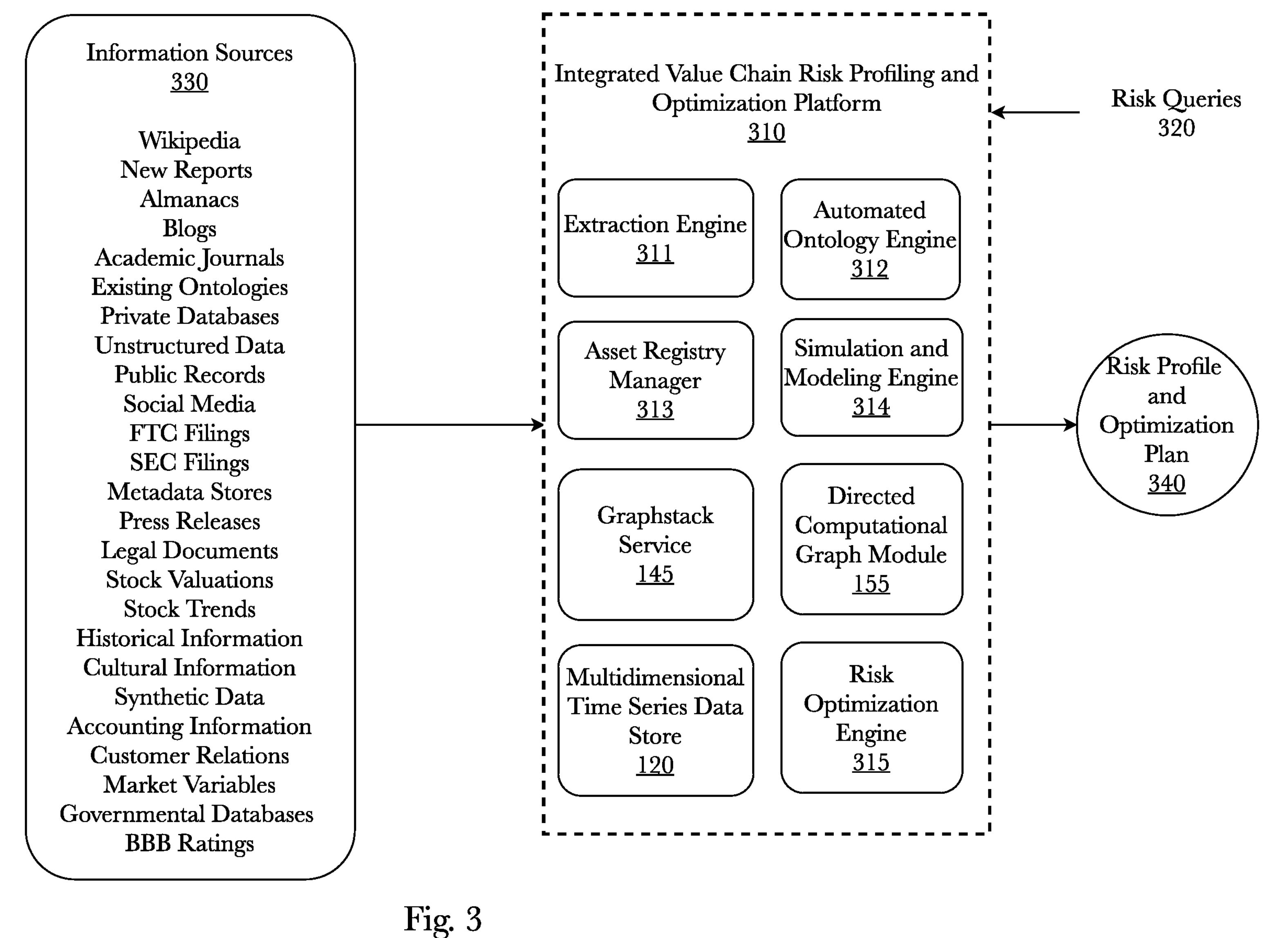
FIG. 3 is a block diagram of an exemplary system architecture for integrated value chain risk-based profiling and optimization.

FIG. 3 is a block diagram of an exemplary system architecture for integrated value chain risk-based profiling and optimization 310. The system 310 may include the components: an extraction engine 311, an automated ontology engine 312, an asset registry manager 313, a simulation and modeling engine 314, a GraphStack service 145, a directed computational graph (DCG) module 155, a multi-dimensional time series data store 120, and a risk optimization engine 315. End users and entities may submit a risk query 320 to the system which initiates the process of generating a risk profile and optimization plan 340. A risk query 320 may be a general query where the end user or entity is wanting an overall disruption risk assessment, or it may be a targeted risk query capturing disruption risk in a specified industry, location, type of disruption, time, and many other searchable characteristics. The system 310 captures relationships between entities and is linked to a DCG-based ingest system which captures metadata around data provenance and model provenance for a variety of information sources 330. The ability to handle data provenance and metadata tracking is of prime importance (given restrictions on usage of different data under HIPAA, CPRA, GDPR, etc.) when creating the best overall data set, which may be partially common and partially distinct for different use cases. Information sources 330 may include private, public, structured or unstructured, synthetic, and alternative data relating to tangible and intangible goods or services. The inclusion of intangible parts of the economy allow the system to model and reason about the digital value chain for software and other intellectual property assets. Since networks may also compromise the software function, network value chain management can also become centrally important to assuring a given data flow is viable and secure (i.e. reliably fit for intended purpose).

The system 310 may be used to ingest alternative data and grow an increasingly active corpora of information about individuals and their links to business entities and one another to build a knowledge base. Furthermore, the system can also trigger targeted collection efforts to obtain information that relates to facts of common interest from suitable sources, approved for public use or release, when identified or inferred from other non-public sources or restricted data sets. A function call is made to an extraction engine 311 that begins to collect data from all available private, public, and proprietary data sources 330 using web-scrapers and data-extraction tools. Detailed information about the extraction engine is contained in U.S. patent application Ser. No. 16/915,176, which is incorporated herein by reference.

The data then flows to an automated ontology engine 312 which runs the information through a variety of tools which perform multi-variate analysis on the information which parses through the information determining relational attributes to value chain. This process appends data with temporal, geospatial (geoJSON formatted), information reliability, contextual metadata, and provenance metadata as determined by the system's 310 machine learning algorithms and ontological axioms configuration. This supports understanding the nature of the data assembled (e.g. sources, how old/stale, observed vs modeled) such that disruption mitigation planning can address observable and expressly non-observable phenomena in modeling. Detailed information about the automated ontology engine is contained in U.S. patent application Ser. No. 16/915,176, which is incorporated herein by reference. The automated ontology engine 314 stores processed data, using web ontology language (OWL) and property graph extensions rooted in value chain ontology into the system's time-series data store 120.

The simulation and modeling engine 314 may access the stored value chain data and the temporospatial knowledge graph to perform a variety of entity-centric behavioral analyses, ad hoc analytics, and visualizations at scale in regards value chain disruptions and event forecasting. The simulation and modeling engine 314 may leverage public and private information on small or non-public business both real and/or simulated and/or synthetically generated via tools like Snorkel or a generative adversarial network (GAN) to find insight into the temporospatial knowledge graph. The mapping of individuals into the integrated value chain is becoming increasingly important, especially when considering the effects of demand shocks at the consumer and business levels are increasingly important in global economic output forecasting. This requires that demand shocks and supply shocks must be considered when modeling, especially for events such as economic and political uncertainty, or more recently Covid-19. The simulation engine 314 may be used to simulate and model what-if scenarios for value chain disruptions and possible optimizations to mitigate the disruption risks. The simulation risk disruption results may include information such as the likelihood of a disruption event occurring, the type of risk(s) caused by the event, the financial impact to the business or entity, the time to recover, and potential optimization outcomes. This list of disruption results is non-exhaustive and merely a simple representation of the many insights into value chain disruption risks that can be found using simulation and modeling. The simulation disruption results are sent to the risk optimization engine where the disruption results are used to produce an entity specific risk profile and optimization plan 340.

After the integrated value chain ontological databases have been created and/or updated, a directed computational graph module 155 utilizing the ontologies generates an advanced temporospatial knowledge graph. A GraphStack service 145 identifies subgraphs of interest (from the temporospatial knowledge graph), returns the subgraphs of interest, and bulk loads the data about the edges and vertices based on their swimlanes from the time-series data store into a distributed processing system (e.g., Apache Spark). The distributed processing system then creates graphframes and performs comparative analysis of individual time slices which provide temporospatial information to the risk optimization engine 315. This information is used by the risk optimization engine's 315 machine learning algorithms to determine the value chain risk impact likelihood to the entity. Furthermore, the risk optimization engine 315 uses spectral graph theory (adjacency matrices) to perform additional comparative temporospatial analysis in parallel with the distributed processing system's graphframe analysis to provide deeper comparative analysis thus providing more reliable results of the risk profile and optimization plan 340. More specifically, the risk optimization engine 315 using the comparative analysis results and the simulation disruption results, parse each result through a machine learning algorithm which identifies, categorizes, and scores each relation with a value chain disruption risk score. The risk optimization engine 315 then sums all scores and produces a value chain disruption risk profile and optimization plan 340 to the client comprising the temporospatial knowledge graph and numerical risk score.

The system 310 may optionally include an asset registry manager 313 and/or a legal document engine. The asset registry manager 313 comprises an asset registry database, a provenance manager, an ontology manager, and an interoperability manager. The asset registry manager 313 is responsible for unified contextualization of computing resources by identifying and storing provenance metadata and allows for sharing of assets between systems. The asset registry may be used by the system 310 to store information about intangible goods such as software, software bill of materials, computing resources such as workflows and processes, software components, intellectual property, among other things. Detailed information about the asset registry manager 313 is contained in U.S. patent application Ser. No. 16/915,176, which is incorporated herein by reference. A legal document engine may further provide information about intangible objects such as political, financial, environmental, and trade regulations as well as contracts between entities and individuals. A legal document engine is able to scan legal documents to identify facts using a combination of natural language (NLP) and semantic processing. This provides rich context surrounding value chain behavior, consumer demand, and geopolitical constraints. Detailed information about the legal document engine is contained in U.S. patent application Ser. No. 16/654,309, which is incorporated herein by reference.

As an example of temporospatial comparative analysis, assume that mask wearing guidelines had not been adopted in the United States and is a current topic of discussion. If a risk query was initiated by a mask manufacturing company that produced N-95 masks, the knowledge graph generated would include vertices and edges derived from public/legal discourse as well as proposed governmental legislation that a potential law requiring all citizens to wear a mask may be imminent. This would be understood by comparative analysis on temporospatial slices in the form of graphframes and adjacency matrices where the risk rating engine 315 would assign a higher risk score based on the analysis. This example illustrates why temporospatial attributes are critical to understanding risk in today's global market. Typical supply chain management systems focus primarily on time-based (temporal) data that tracks when a good or service was produced, distributed, and sold. This provides a limited view on the integrated value chain as the production, distribution, and sale of a good or service does not exist in a vacuum where external factors do no exist. Indeed, there is a dearth of externalities that can greatly impact a value chain, and the inclusion of spatial data provides more context into negative externalities that may affect a value chain. More detail on the knowledge graph and risk optimization engine 315 follows in FIG. 4 and FIG. 5.

Figure 4:
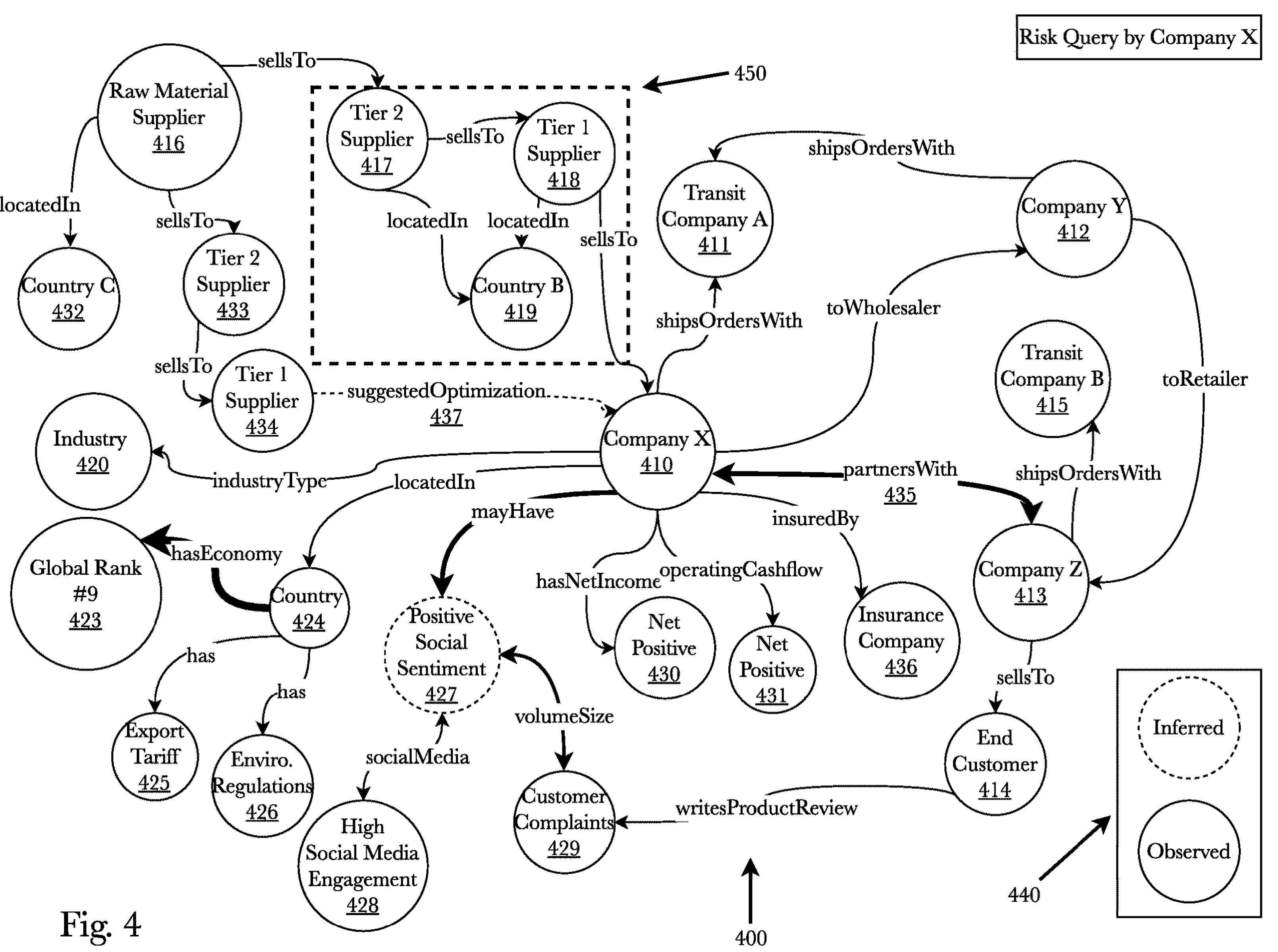
FIG. 4 is a weighted directed graph diagram showing an exemplary temporospatial enriched knowledge graph and its possible use in creating a value chain disruption risk and optimization plan.

FIG. 4 is a weighted directed graph diagram showing an exemplary temporospatial enriched knowledge graph 400 and its possible use in creating a value chain disruption risk and optimization plan. The temporospatial enriched knowledge graph (TEKG) 400 is created from a plurality of data sources and data types including, but not limited to public, private, synthetic, structured, unstructured, inferred, proprietary, and individual data. The TEKG 400 may be used to map the integrated value chain of a company, industry, region, or given sufficient time for data ingestion, the global integrated value chain of all industries. Consequently, the knowledge graph it creates may be massive, comprised of billions of vertices and edges representing and capturing the complex, interwoven, dynamic nature of integrated value chain relationships between and among entities within the value chain. The knowledge graph contained within this diagram is a very simplified snapshot of a knowledge graph for illustrative purposes only. Once a risk query is presented to the integrated value chain risk profiling and optimization platform 310, entity-centric behavioral analysis tools in combination with the subject of the risk query are used to identify subsets of the overall knowledge graph that pertain to the risk query and perform risk analysis and characterization. The TEKG 400 of this example is the result of an interested party, Company X 410, conducting a risk query about its own value chain. Interested parties may include, investors, potential clients or business partners, investigators, regulators, etc.

Looking at this simplified example, one might initially notice that Company X 410 has business interactions with Company Y 412. The user may then make a risk query about Company Y 412 through a new request or by interacting with the node. However, the TEKG 400 has already identified useful and meaningful relations to other entities and generated those within the original risk query by Company X 410. For example, it may be determined, through legal contracts, product shipping databases, company records, or government records that Company X 410 and Company Y 412 both have used or are currently using the same Transit Company A 411 to ship products. Furthermore, the TEKG 410 displays the value chain as it progresses from wholesale Company Y 412 to the retailer Company Z 413 which employs Transit Company B 415 to ship online orders to End Customer(s) 414. In this way, the TEKG 410 can include information and data about the value chain down to the individual level. For example, Company X 410 is a factory that produces laptops and End Customer 414 purchases one of Company X's 410 laptop from a retail company and writes a negative product review for the new purchase because the keyboard keys are brittle and of poor quality. One of the advantages of the TEKG 400 compared to existing supply chain management systems, is the ability to layer private data from paid vendors with end-user and public records data to provide a more comprehensive and contextualized representation of the underlying value chain. The inclusion of End Customer 414 data such as product reviews can identify the most common reason for Customer Complaints 429 and allow Company X 410 to view in one place (node) the aggregation of customer reviews and to possibly take action in response to the Customer Complaints 429.

The TEKG 400 generated by the risk query by Company X 410 also includes information about the company that may not directly be tied to value chain processes. For example, the knowledge graph could identify that Company X 410 has partnered with 435 retail Company Z 413 which may mean that Company X 410 produces an exclusive line of laptops just for Company Z 413 or has some kind of promotional or marketing contract with that retailer. Other types of information about Company X 410 found within the TEKG 400 may include the type of industry (domain) of which Company X 410 is a part, financial information 430, 431 such as net income, operating cashflow, capital expenditures, etc., insurance information such as the Insurance Provider 436, hedged risks, private reinsurance partners, and insurance policy coverage and adjustments. Additionally, the TEKG 400 may include information about the country 424 in which Company X 410 is located such as the country's global economic rank 423, its trade regulations such as import/export tariffs 425, its environmental regulations 426, its political climate, its trade agreements with other nations, its population and their spending/saving habits, etc.

The system may be configured to provide additional insights. As an example, the system may be configured to show the amount of observed and reliable data points and to manifest as the weight of the edges, as in partnersWith 435. Where the weight of the edge partnersWith 435 is heavier due to both companies 410, 413 connected on multiple social media platforms and ingested news reports and online articles detailing the partnership, as opposed to only one data point to show that Company X 410 manufactures laptops that Company Z 413 carries in stock. This also illustrates how the inclusion of public and unstructured data can add more context and provide a better understanding of the underlying value chain.

As another example, the system may be configured to show the inferred risk as differing diameters of vertices (node). According to risk query by the user, the system may have determined that considering temporal and public sentiment that global rank 423 of the country 424 in which Company X 410 is located in, is more significant to the risk query constraints than is an export tariff 425 and that environmental regulations 426 are more significant than the tariff. A multitude of configurations are optionally available and more may be added with relative ease. The temporospatial knowledge graph 400 also provides context into whether vertices and edges are formed from inferred algorithms or observed 440 through reliable data points. Ingesting unstructured data such as websites, blogs, news articles, and social media 428 as well as proprietary data such as customer relations data 429 may be used to understand sentiment 427 and potential disruption risks of Company X 410.

The TEKG 400 also displays Company X's 410 upstream value chain actors starting at Raw Material Supplier(s) 416 and progressing down through multiple tiers of suppliers 417, 418 until the supplies are sold to Company X 410. If Company X 410 is a laptop manufacturer, then the Raw Material Supplier 416 may sell crude oil to Tier 2 Suppliers 417, 433 which produce plastic granulate from the crude oil. The Tier 1 Suppliers 418, 434 may produce keyboards with the purchased plastic granulate. Company X 410 purchases keyboards from Tier 1 supplier 418 to manufacture laptops. In this way the entire value chain for Company X 410 from raw materials to the end customer is mapped and disruption risk(s) may be identified and quantified to present a disruption risk profile of Company X 410.

As an example, behavioral analysis of Company X's 410 mapped integrated value chain may identify a cluster 450 within the map as a potential locational disruption risk. The cluster 450 encompasses the Tier 1 417 and Tier 2 418 suppliers that Company X 410 relies on to enable their manufacturing processes as well as the country 419 that both suppliers operate in and the country's associated data such as various forms of regulations, location, trade agreements, political climate, and other such information. Analysis of the TEKG 400 and all its comprising data indicates that Country B 419 historically experiences an extreme weather event such as hurricane, flood, or earthquake every three years on average. Further analysis of Country B's 419 environmental and governmental data shows that the intensity of the extreme weather events is increasing and as a result the time Country B 419 takes to recover from each event increases. The simulation and modeling engine 314 can use the underlying data set that produced the TEKG 400 to simulate what-if scenarios pertaining to extreme weather events in Country B 419 and the potential impact of such events to Company X 410.

As an example, the simulated results may indicate that there is a high locality disruption risk due to the fact that both suppliers reside in the same country and that an extreme weather event could disrupt both suppliers causing a supply shock to affect Company X's 410 ability to produce laptops. The risk optimization engine 315 receives the simulated results and produces an optimization plan 340 for Company X 410. The optimization plan 340 may include one or more potential optimization options. For example, using Company X's 410 sales data and Country B's 419 governmental economic data relating to extreme weather events, an optimization plan may suggest Company X 410 keep surplus inventory of 50,000 laptops in the event that an extreme weather event disrupts the entire country where the suppliers operate. The risk optimization engine 315 considered the suppliers time to recover and the sales data of the laptop manufacturer to conclude that a surplus of 50,000 laptops would allow Company X 410 to remain operational and profitable during a supply shock disruption event. A different optimization plan may indicate that the severity and frequency of extreme weather events in County B 419 produce too much uncertainty and potential economic loss. Therefore, the optimization plan suggests 437 that Company X 410 expand their supplier network to include Tier 1 Supplier 434 so that said company is better situated to mitigate the effects of extreme weather events on its value chain.

The graph exemplified here does not include all integrated value chain risk profiling and optimization platform 310 features, present or future, and is intended as a simplified version of a temporospatial enriched knowledge graph 400.

Detailed Description of Exemplary Aspects

Figure 5:
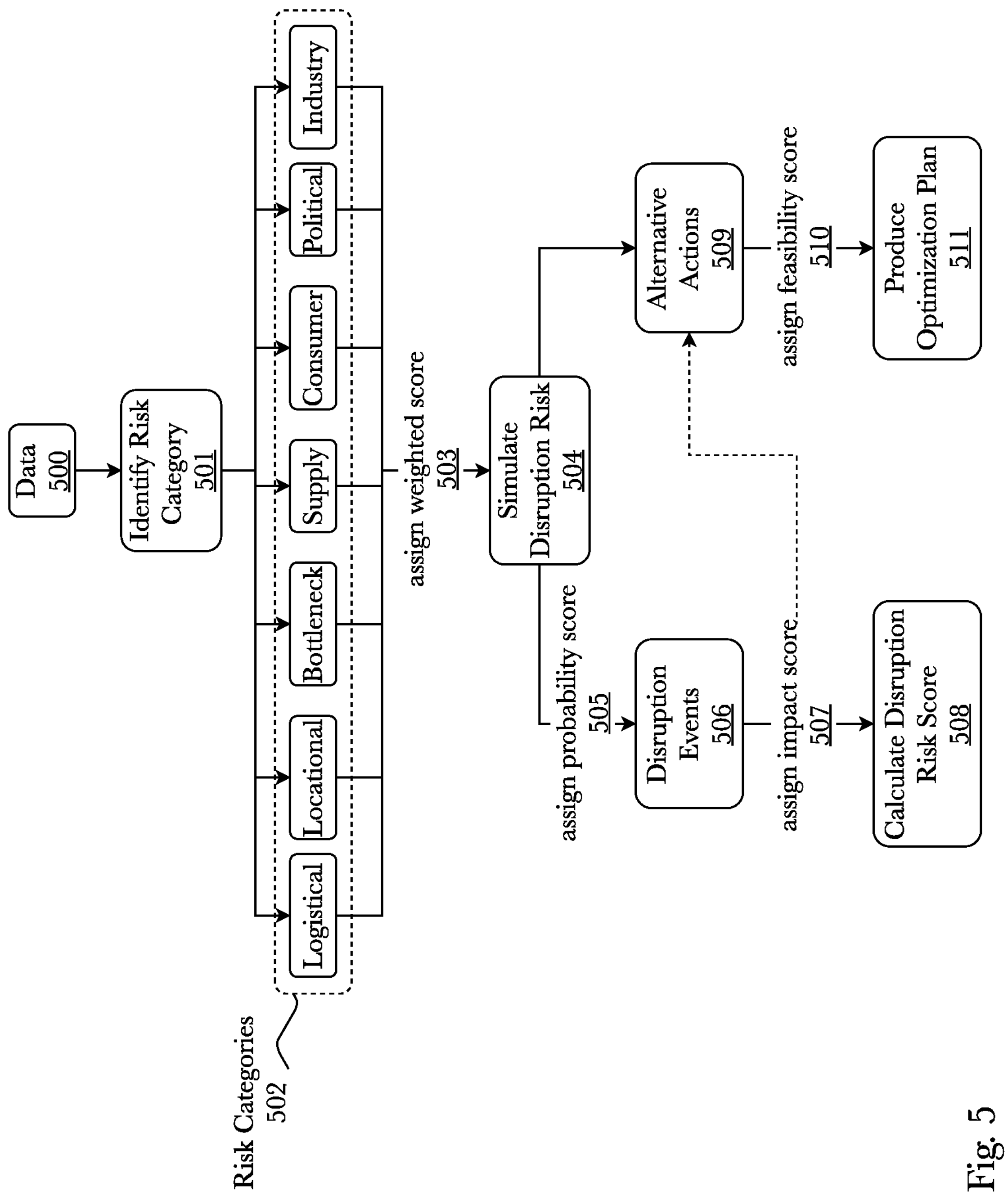
FIG. 5 is a flow diagram illustrating an exemplary algorithm for an integrated value chain risk profiling and optimization platform.

FIG. 5 is a flow diagram illustrating an exemplary algorithm for an integrated value chain risk profiling and optimization platform. The integrated value chain dataset 500 enters the risk optimization engine 315. The system first identifies potential disruption risks 501 by performing relational analysis on an entity specific subset of the TEKG 400. The relational analysis uses deep learning techniques and deductive reasoning on the graph subset and its underlying data and metadata to identify relationships and dependencies which may be susceptible to a given risk category. Each identified risk category 502 is then assigned a weighted score 503 based upon the number of relationships and dependencies which may be affected by an identified disruption risk. The next step in the process is to repeatedly simulate the disruption risk(s) 504 in order to form an aggregated view on the likelihood of the disruption event occurring. From this aggregation the system may assign a probability score 505 to a disruption event. Disruption event(s) 506 that surpass a predetermined threshold for probability are further simulated to identify and quantify the impact to the value chain of interest. The simulations may at least include private and public data, synthetic data, and simulated data used contemporaneously to provide a comprehensive and more robust view of the disruption event impact. The impact of the disruption may be determined by measuring one or more of the financial, social, environmental, security, or logistical costs endured by the entity making the risk query 320. After the disruption risk impact has been quantified, an impact score is assigned 507 to the disruption risk category. Finally, the scores are summed 508 and risk score is generated.

Running in parallel to the simulated disruption events are simulated alternative actions 509. Alternative actions are simulation scenarios in which a disruption event occurs, but the existing value chain model is modified so as to lower the impact of the disruption event. The disruption event impact of each alternative action is compared against the impact score 507 of the non-modified value chain. Alternative actions that result in a lower impact score are then assigned a feasibility score 510 which captures how readily the alternative action could be implemented by an entity and may consider the economic cost (i.e. capital, infrastructure, process, training, environment), the time to implement, location, potential losses, etc. The feasibility score 510 is used to rank different alternative actions 509 so that one or more of the highest scoring alternative actions may be presented to the end user via an optimization plan.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
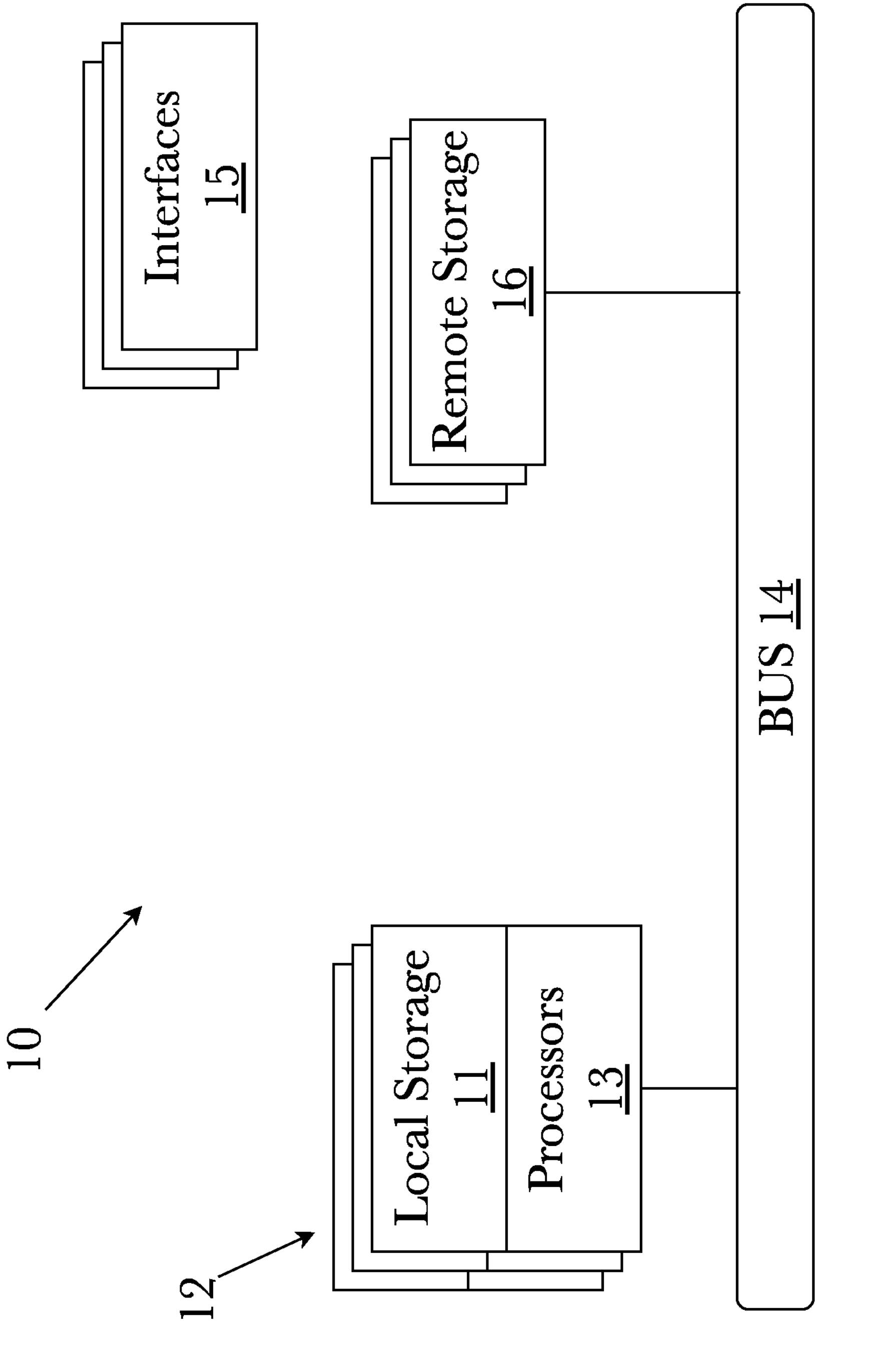
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
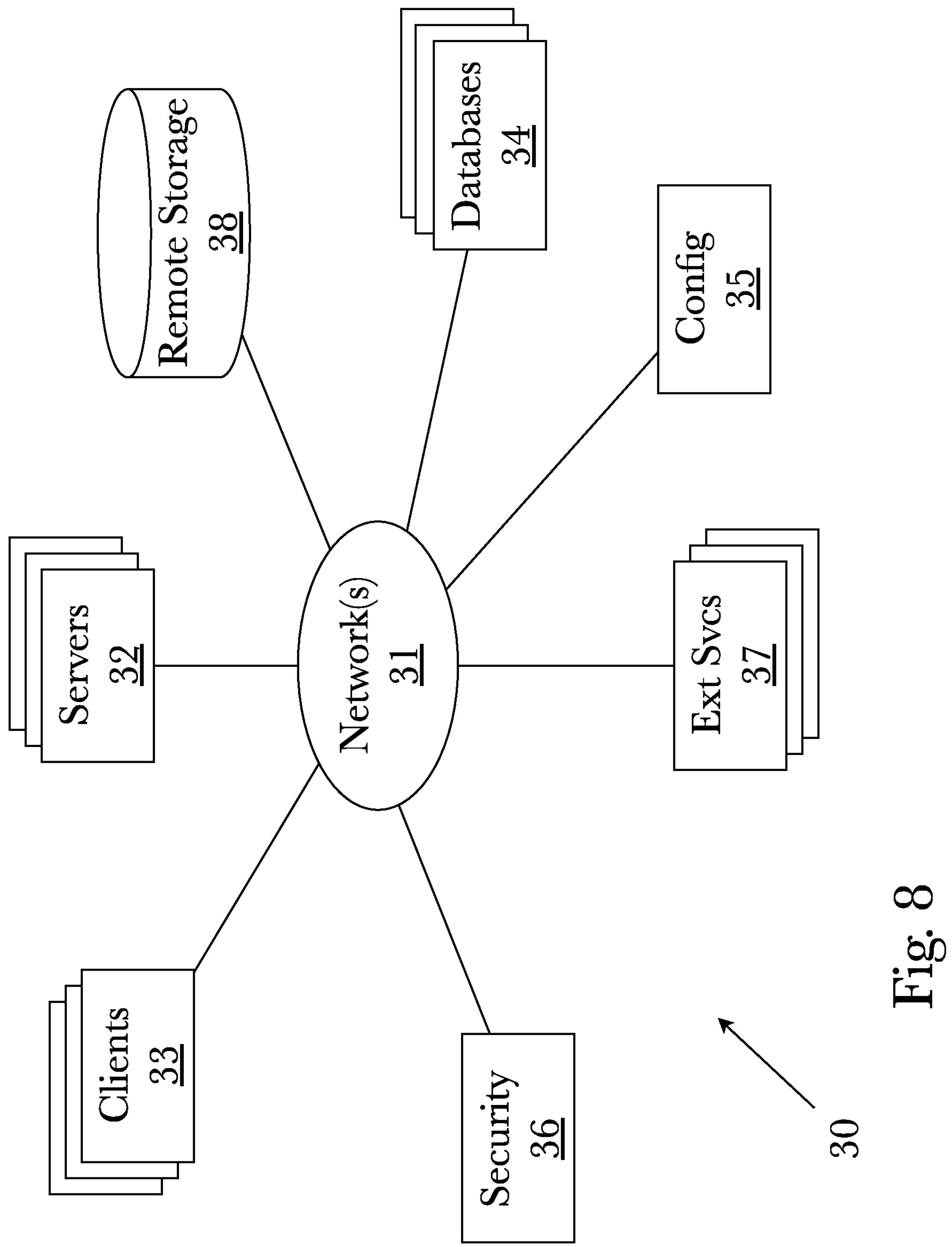
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call.

Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
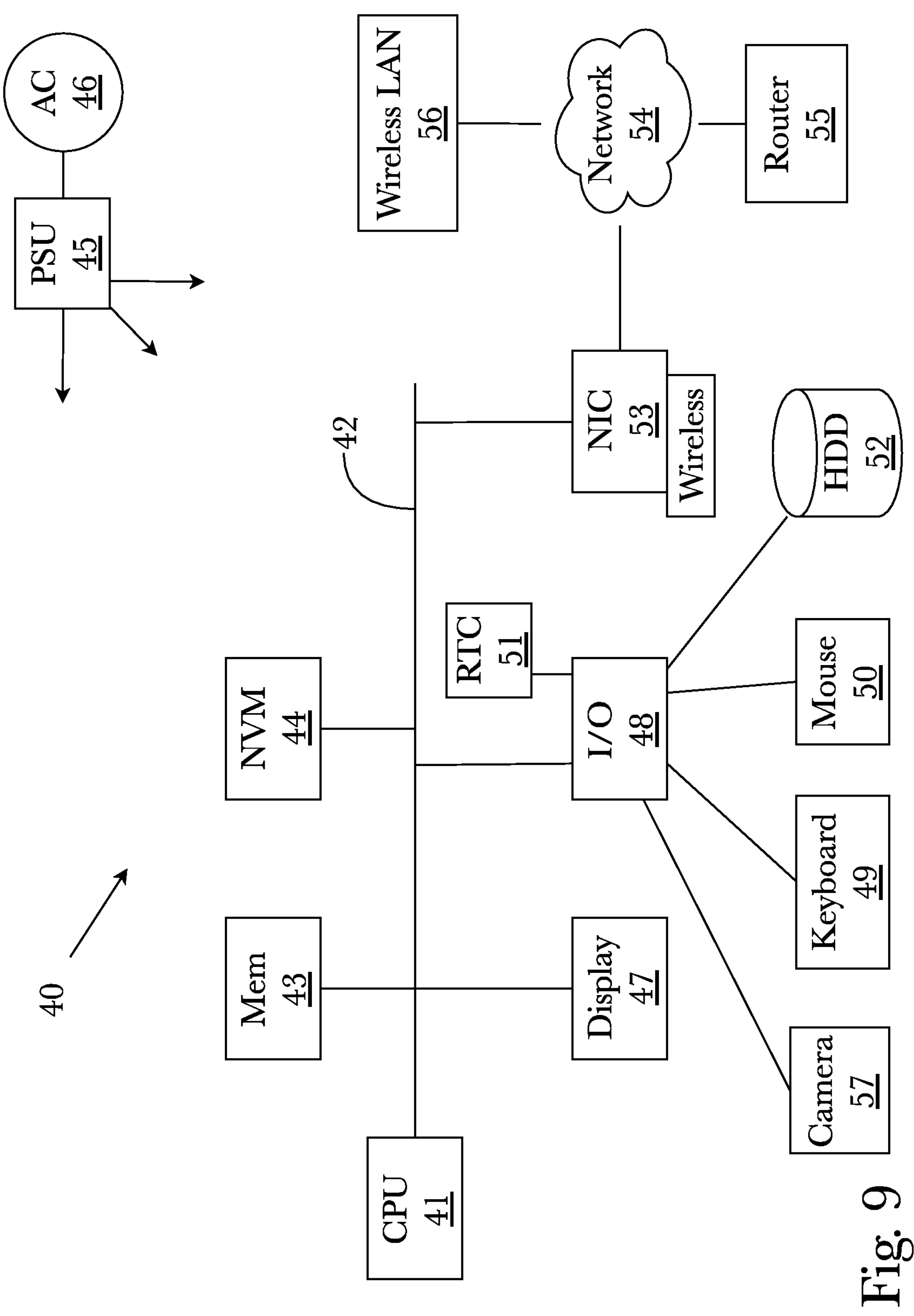
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computer system for integrated value chain risk-based profiling and optimization, comprising:

a hardware processor configured to execute software instructions stored on non-transitory machine-readable storage media that cause the computing device to:

analyze an integrated value chain ontological database comprising aggregated data from a plurality of heterogeneous sources, the database being ontologically structured, for information related to a risk query, wherein the information related to the risk query comprises entities, individuals, and locations;

create or update a weighted and directed temporospatial knowledge graph based on the database, the weighted and directed temporospatial knowledge graph comprising a first set of nodes representing entities, a second set of nodes representing entity descriptors, and weighted edges representing relationships among the nodes, wherein the weighted and directed temporospatial knowledge graph spans a plurality of time periods and geographical locations, and incorporates provenance and contextual metadata, and wherein the weighted and directed temporospatial knowledge graph represents a digital version of the integrated value chain;

identify one or more paths or clusters of a subset of the weighted and directed temporospatial knowledge graph that meet a pre-determined risk threshold, wherein each of the one or more paths or clusters represents a risk category;

perform one or more discrete event simulations using data from at least part of the integrated value chain ontological database, the data used in performing the one or more discrete event simulations comprising real-world and partial synthetic data, wherein:

each discrete event simulation models propagation of disruption events through entity relationships in the weighted and directed temporospatial knowledge graph to determine a probability and disruption impact associated with the disruption event; and a subset of the plurality of discrete event simulations models alternative actions in response to disruptive events to identify potential mitigation strategies for disruption events; and assign, using a trained machine-learning model that processes outputs of the one or more discrete event simulations, a risk score to each risk category represented by the one or more paths or clusters, based on the probability and the disruption impact associated with the risk query;

wherein the analysis of the aggregated data from the plurality of heterogeneous sources, the updating of the weighted and directed temporospatial knowledge graph, the identification of one or more paths or clusters, the performance of the one or more discrete event simulations, and the assigning of the risk score are performed iteratively such that updates occur in response to new data from the plurality of heterogeneous sources or new outputs of the discrete event simulations.

2. The system of claim 1, wherein the hardware processor is further configured to execute software instructions stored on non-transitory machine-readable storage media that cause the computing device to:

receive data collected using web-scrapers and data-extraction tools, from all available data sources;

scan the received data for provenance metadata;

run the received data through a variety of tools to append the data with temporal, geospatial, information reliability, contextual metadata, and provenance metadata using machine learning algorithms and ontological axioms configuration; and store the appended data in the integrated value chain ontological database.

3. The system of claim 2, wherein the data sources include at least parts of public, private, and proprietary data sources.

4. The system of claim 1, where the discrete event simulations model a fraud event, and assign a fraud risk score to a fraud category.

5. The system of claim 1, wherein the hardware processor is further configured to execute software instructions stored on non-transitory machine-readable storage media that:

generate, using spectral graph theory applied to adjacency matrices representing time slices of the weighted and directed temporospatial knowledge graph, comparative temporal analyses of value chain relationships in parallel with the discrete event simulations.

6. A method for integrated value chain risk-based profiling and optimization, comprising the steps of:

analyzing an integrated value chain ontological database comprising aggregated data from a plurality of heterogeneous sources, the database being ontologically structured, for risk query-related information, the query-related information comprising entities, individuals, locations, and topics associated with the subject;

creating or updating a weighted and directed temporospatial knowledge graph based on the database, the weighted and directed temporospatial knowledge graph comprising a first set of nodes representing entities, a second set of nodes representing entity descriptors, and weighted edges representing relationships among the nodes, wherein the weighted and directed temporospatial knowledge graph spans a plurality of time periods and geographical locations, and incorporates provenance and contextual metadata, and wherein the weighted and directed temporospatial knowledge graph represents a digital version of the integrated value chain;

identifying paths or clusters of a subset of the weighted and directed temporospatial knowledge graph which meet a pre-determined risk threshold wherein the paths or clusters represent risk categories;

performing a plurality of discrete event simulations using data from at least part of the integrated value chain ontological database, the data used in performing the plurality of discrete event simulations comprising real-world and partial synthetic data wherein:

each discrete event simulation models propagation of disruption events through entity relationships in the weighted and directed temporospatial knowledge graph to determine a probability and disruption impact associated with the disruption event; and a subset of the plurality of discrete event simulations models alternative actions in response to disruptive events to identify potential mitigation strategies for disruption events; and assigning a risk score to each risk category represented by the one or more paths or clusters, based on the probability and the disruption impact associated with the risk query;

wherein the analysis of the aggregated data from the plurality of heterogeneous sources, the updating of the weighted and directed temporospatial knowledge graph, the identification of one or more paths or clusters, the performance of the one or more discrete event simulations, and the assigning of the risk score are performed iteratively such that updates occur in response to new data from the plurality of heterogeneous sources or new outputs of the discrete event simulations.

7. The method of claim 6, further comprising the steps of:

receiving data collected using web-scrapers and data-extraction tools, from all available data sources;

scanning the received data for provenance metadata;

running the received data through a variety of tools to append the data with temporal, geospatial, information reliability, contextual metadata, and provenance metadata using machine learning algorithms and ontological axioms configuration; and store the appended data in the integrated value chain ontological database.

8. The method of claim 7, wherein the data sources include at least parts of public, private, and proprietary data sources.

9. The method of claim 6, where the discrete event simulations model a fraud event, and assign a fraud risk score to a fraud category.

10. The method of claim 6, further comprising the step of:

generating, using spectral graph theory applied to adjacency matrices representing time slices of the weighted and directed temporospatial knowledge graph, comparative temporal analyses of value chain relationships in parallel with the discrete event simulations.

* * * * *